United States Patent [19]
Losel

[11] Patent Number: 5,087,871
[45] Date of Patent: Feb. 11, 1992

[54] POWER SUPPLY WITH INRUSH CURRENT LIMITER

[75] Inventor: Walter Losel, Fürth, Fed. Rep. of Germany

[73] Assignee: U.S. Philips Corporation, New York, N.Y.

[21] Appl. No.: 591,539

[22] Filed: Oct. 2, 1990

[30] Foreign Application Priority Data

Oct. 17, 1989 [DE] Fed. Rep. of Germany ....... 3934577

[51] Int. Cl.$^5$ .............................................. H02H 9/02
[52] U.S. Cl. .................... 323/299; 323/303; 323/908; 361/18; 361/90; 361/91
[58] Field of Search ................. 363/49; 323/299, 303, 323/908; 361/18, 90, 91, 111

[56] References Cited

U.S. PATENT DOCUMENTS

| 3,935,511 | 1/1976 | Boulanger et al. |
| 4,396,882 | 8/1983 | Kellenbenz ..................... 323/908 X |
| 4,744,369 | 5/1988 | Kroll ............................. 323/908 X |

FOREIGN PATENT DOCUMENTS 3535864  4/1987  Fed. Rep. of Germany .

Primary Examiner—Steven L. Stephan
Assistant Examiner—Emanuel Todd Voeltz
Attorney, Agent, or Firm—Bernard Franzblau

[57] ABSTRACT

A power supply circuit which includes a current limit circuit for limiting the inrush current when the power supply is switched on. The current limit circuit is coupled between a supply voltage at the input end of the power supply and a storage capacitor at the output end of the power supply. The current limit circuit includes a first semiconductor switch having a resistor in parallel with its switching path. In parallel with the control path of the first semiconductor switch is a parallel circuit that includes a first capacitor, a first resistor and the switching path of a second semiconductor switch. The control electrode of the second semiconductor switch is connected to a tap on a first voltage divider to which a second capacitor is connected in parallel. The switching path of a third semiconductor switch is connected parallel to the control path of the second semiconductor switch. The third semiconductor switch is cut off in response to a control current supplied by a threshold value circuit when the supply voltage is below a threshold value.

20 Claims, 1 Drawing Sheet

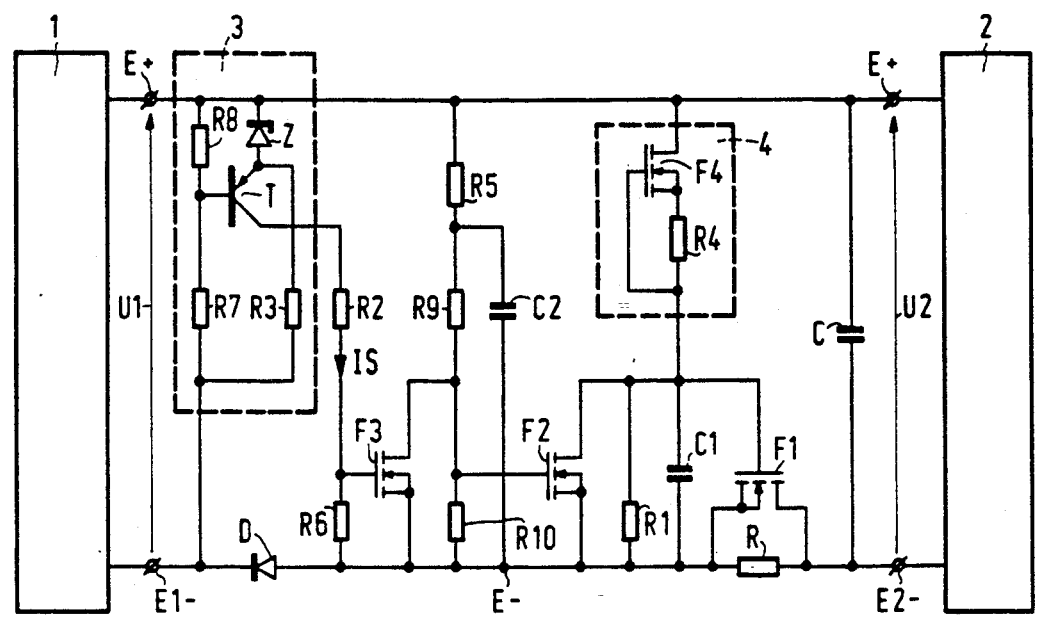

POWER SUPPLY WITH INRUSH CURRENT LIMITER

BACKGROUND OF THE INVENTION

This invention relates to a power supply unit comprising, between an input supply voltage terminal and a storage capacitor at an output terminal, an inrush current limiting circuit having a first semiconductor switch and a resistor in parallel to the switching path of the semiconductor switch. In parallel with the control path of the semiconductor switch is a parallel circuit comprising a first capacitor and a first resistor, as well as a switching path of a second semiconductor switch.

Power supply units for data transmission systems convert a DC voltage (supply voltage), which is derived by rectification from, for example, an exchange battery or the mains voltage, into a stabilized output voltage by means of a DC voltage converter. A storage capacitor is connected ahead of the DC voltage converter to bridge short-period supply voltage failures. The result of this is that, when the power supply unit is switched on, a high inrush current flows into the storage capacitor, which implies a dip in the supply voltage. In addition, the high inrush current may lead to an inadvertent triggering of safety cut-outs during the switch-on procedure.

DE-A 35 35 864 discloses a current limiting circuit which is designed to protect a load circuit comprising a storage capacitor and connected via this current limiting circuit in the case of short-period overvoltages and overcurrents. A field effect transistor is used for this purpose. The FET switching path is shunted by a parallel resistor and a current measuring resistor is connected in series therewith. To control the field effect transistor, a current evaluation circuit is connected to the current measuring resistor. The parallel resistor is connected to the current evaluation circuit in such a way that its current component is also evaluated. When the field effect transistor is cut off, the entire load current flows through the parallel resistor. The current evaluation circuit consists of a bipolar transistor whose emitter is connected to the current measuring resistor and whose base is connected to the source electrode of the field effect transistor via a resistor. If the voltage drop across the current measuring resistor exceeds a given maximum value, the bipolar transistor becomes conductive. This renders the control voltage (gate-source) of the field effect transistor zero and the field effect transistor is fully cut off. The entire current then flows through the parallel resistor. Below the maximum value of the voltage drop across the current measuring resistor the field effect transistor takes over a current component proportional to the voltage drop, while the remaining current component flows through the parallel resistor. In a further circuit modification, a delay unit consisting of a parallel circuit of a capacitor and a resistor is provided to delay the switching-on of the field effect transistor. A quick discharge of the storage capacitor must be ensured after a supply voltage failure in order to provide a short restoration time of the current limiting circuit. To this end, a PTC resistor is connected in parallel to the storage capacitor. The entire load current flows through the current measuring resistor, which may cause considerable power losses in the circuit.

SUMMARY OF THE INVENTION

An object of the invention is to provide an improved power supply of the type mentioned in the opening paragraph. In this power supply, the inrush current limiting circuit is to have low power losses and the supply voltage is to become operational again without delay even in the case of frequently and quickly occurring dips in the supply voltage.

This object is achieved in a power supply of the type mentioned in the opening paragraph in that the control electrode of the second semiconductor switch is connected to the tap of a first voltage divider to which a second capacitor is connected in parallel, while the switching path of a third semiconductor switch is parallel to the control path of the second semiconductor switch, which third semiconductor switch is cut off in dependence on a control current supplied by a threshold value circuit when a threshold value of the supply voltage is not achieved.

Other embodiments of the invention are described below in the dependent claims.

BRIEF DESCRIPTION OF THE DRAWING

The invention will be explained in more detail below with reference to the embodiment shown in the single Figure of the drawing.

The single FIGURE shows a power supply with an inrush current limiting circuit.

DESCRIPTION OF THE PREFERRED EMBODIMENTS

In the embodiment shown in the Figure, the circuit arrangement for limiting the inrush current is situated between a voltage supply 1, which supplies a DC voltage (supply voltage U1) derived from, for example, an exchange battery or a mains rectifier, and a DC voltage converter 2, at whose inputs is applied an operating voltage U2 also present across a storage capacitor C. The inrush current limiting circuit comprises a first electronic semiconductor switch F1, which is constructed as an n-channel MOS field effect transistor and which has a parallel resistor R connected in parallel to its switching path (drain-source). The drain electrode of the first field effect transistor F1 is connected to the negative pole E2− of the operating voltage U2. The source electrode is at a potential E− and is connected to a first pole, i.e. the negative terminal or pole E1− of the supply voltage U1 via a diode D. The diode D prevents the discharge of the storage capacitor C in the case of voltage dips of the supply voltage U1 and is advantageously constructed as a Schottky diode, which has a breakdown voltage of approximately 0.3 V and thus low losses. In parallel to the control path (gate-source) of the first field effect transistor F1 is arranged a delay unit consisting of a parallel circuit of a first capacitor C1 and a first resistor R1. The delay unit R1, C1 is arranged in parallel to the switching path of a second semiconductor switch F2. The capacitor C1 is charged by a constant-current source 4 which is connected to a, reference potential, e.g. the input supply voltage terminal E+. The constant-current source is formed by a fourth field effect transistor F4 and a fourth resistor R4 in the embodiment shown in the Figure. To this end, the drain electrode of the fourth field effect transistor F4 is connected to the reference potential E+ and the gate electrode is connected to the delay unit R1, C1 and, via the fourth resistor R4, to the source electrode of the fourth field effect transistor F4. The control electrode of the second field effect transistor F2 is connected to the tap of a first voltage divider formed by two resistors R9, R10 with a second capacitor C2 connected in parallel thereto. The second capacitor C2, moreover, is connected to the reference potential E+ via a fifth resistor R5. In an embodiment not shown in the Figure, the fifth resistor R5 is connected to the reference potential E+ via a further diode, which prevents the discharge of the capacitor C2 through the resistor R5 in the case of a voltage dip of the operating voltage U2. In parallel to the control path of the second semiconductor switch F2 is arranged the switching path (drain-source) of a third field effect transistor F3 whose gate electrode is connected on the one hand to the potential E− via a sixth resistor R6 and on the other hand to the collector of a pnp transistor T via a second resistor R2. The emitter of the transistor T is connected to the reference potential E+ via a zener diode Z and to the negative pole E1− of the supply voltage U1 via a third resistor R3. The base of the transistor T is connected to the central tap of a second voltage divider which is arranged at the input side and consists of two resistors R7, R8. The transistor T, the second voltage divider R7, R8 and the third resistor R3 and the zener diode Z thus constitute a threshold value circuit 3, which supplies a control current IS when the supply voltage U1 drops below a threshold value. In a further embodiment, a diode is connected between the common contact point of the resistors R3, R7 and the negative pole E1− of the supply voltage U1, which diode protects the transistor T in the case of wrong polarity of the supply voltage U1.

Before the current supply device is switched on, the storage capacitor C and the capacitors C1, C2 are not charged. The semiconductor switches F1, F2, F3 are constructed as n-channel MOS field effect transistors of the enhancement type in the embodiment represented in the Figure, so that they are cut off before switching on the current supply device. Thus, the load current flows through the parallel resistor R during switch on and is effectively limited by it. To the extent to which the first capacitor C1 is charged by the constant-current source 4 after switch on, the control voltage at the gate-source path of the field effect transistor F1 thus builds up slowly in such a way that this transistor gradually becomes conductive and finally completely shunts the parallel resistor R. In this way an effective limitation of the load current at the switch-on is achieved by the slow switch-on of the first field effect transistor F1 ("soft start"). The entire load current flows first through the parallel resistor R during the switch-on procedure and, after a switch-on delay time, the length of which is determined by the constant current derived from the constant current source and by the value of the first capacitor C1, it flows directly, i.e. with low losses, through the drain-source path of the first field effect transistor F1.

In the embodiment shown in the Figure, the supply voltage U1 is monitored by means of the threshold value circuit 3. The resistors R7, R8 of the second voltage divider and the zener diode Z are so dimensioned here that the transistor T is conductive above a threshold value of the supply voltage U1. The transistor T is conductive when the base-emitter voltage of approximately 0.6 V necessary for switching the transistor T to the conductive state is exceeded, which voltage is derived from the differential between the voltages developed across the resistor R8 and the zener diode Z (reference voltage). The third resistor R3 ensures that a current will flow through the zener diode Z and the resistor R3 when transistor T is cut off so that the reference voltage required for switching the transistor T to the conducting state is present at the zener diode Z. In a practical circuit arrangement, the value of the supply voltage U1 during normal operation is 60 V and the threshold value is 55 V. If the current supply device operates normally after switch-on, i.e. there are no dips or interruptions in the supply voltage U1, the transistor T will conduct at a supply voltage above the threshold value, i.e. a collector current flows in the form of a control current IS. The control current causes a voltage drop across the sixth resistor R6 which is parallel to the control path of the third field effect transistor F3. This controls the field effect transistor F3 so that it becomes conductive. This means that the control path (gate-source) of the second field effect transistor F2 is shunted by the switching path (drain-source) of the third field effect transistor F3 with low ohmic resistance, so that the second field effect transistor F2 becomes cut off. In this normal operating condition, furthermore, the second capacitor C2 is charged via the fifth resistor R5 and the first capacitor C1 is charged from the constant-current source 4. Since the second field effect transistor F2 is cut-off, a voltage is present between the gate and source electrodes of the first field effect transistor F1 coupled to the delay unit R1, C1, which voltage is so great that this transistor is conductive. The parallel resistor R is thus shunted with a low ohmic resistance by the drain-source path of the first field effect transistor F1 during normal operation.

When, due to mains voltage dips, the supply voltage U1 drops below the threshold value (for example, below 55 V) determined by the arrangement 3, the transistor T will be cut off since the base-emitter voltage required to switch the transistor T into the conductive state, and determined by the resistor R8 and the zener diode Z, is not achieved. This means that the third field effect transistor F3 is no longer controlled, i.e. no control current IS flows through the sixth resistor R6 anymore. The control voltage between the gate and source electrodes of the third field effect transistor F3 is thus reduced to zero so that this transistor is cut off. After the third field effect transistor F3 has become non-conductive, the second capacitor C2 is discharged via the resistors R9, R10 of the first voltage divider. This discharge leads to a voltage drop at the control path of the second field effect transistor F2, so that it becomes conductive. The second field effect transistor F2 remains conducting as long as the voltage drop across the resistor R10 is above the control voltage required for switching the transistor into the conducting state. Since the second field effect transistor F2 is conducting, the first capacitor C1 is discharged via the drain-source path of the second field effect transistor F2. The result of this is that the voltage between the gate and source electrodes of the first field effect transistor F1 drops and this transistor is finally cut off. Thus, first the entire load current flows through the low ohmic resistance of the drain-source path of the conducting first field effect transistor F1 in normal operation as long as the second field effect transistor F2 remains cut off. In the case of dips or interruptions in the supply voltage U1, however, the second field effect transistor F2 becomes conductive due to the discharge of the second capacitor C2, while at the same time the first field effect transistor F1 becomes cut off so that the entire load current is finally limited by the parallel resistor R.

After the discharge of the first capacitor C1, the first field effect transistor F1 is cut off and the inrush current limiting circuit is immediately ready for operation again. When the switch-on procedure is resumed, therefore, the load current again flows first completely through the parallel resistor R and then gradually, after the charging procedure of the first capacitor C1, directly through the drain-source path of the first field effect transistor F1. This means that the inrush current limiting circuit is ready for operation again without delay even in the case of frequent and quickly occurring dips in the supply voltage.

In a practical embodiment of the circuit arrangement, the value of the first capacitor C1 is 1 $\mu$F and the constant current supplied by the constant-current source 4 is 0.5–1 mA. The resistors R9, R10 of the first voltage divider are so dimensioned that the voltage across the resistor R10, which is to protect the field effect transistor F2, reaches a maximum of 20 V at the maximum value of the supply voltage U1.

The circuit arrangement shown in the Figure operates with low losses since a very low control power is required for the first field effect transistor F1, and because the latter transistor has low power losses during operation. This has the advantage that the first field effect transistor F1 does not require additional cooling. In addition, the load current circuit does not contain any further components with power losses apart from the parallel resistor R in the current-limiting state or the drain-source path of the first field effect transistor F1 during normal operation, plus the diode D which is necessary as a discharge protection for the storage capacitor C. To enhance the power transmitted through the first field effect transistor F1, further field effect transistors may be connected in parallel to it.

I claim:

1. A power supply comprising, between an input terminal for a supply voltage and a storage capacitor at an output terminal, an inrush current limiting circuit including a first semiconductor switch with a switching path and a shunt resistor in parallel to said switching path, a first capacitor coupled to a source of charge current, means connecting a circuit in parallel to a control path of the first semiconductor switch, said parallel circuit comprising the first capacitor, a first resistor and a switching path of a second semiconductor switch, wherein a control electrode of the second semiconductor switch is connected to a tap on a first voltage divider to which a second capacitor is connected in parallel, a switching path of a third semiconductor switch being connected in parallel to a control path of the second semiconductor switch, and a threshold circuit which supplies a control current to cut off the third semiconductor switch below a threshold value of the supply voltage.

2. A power supply as claimed in claim 1, wherein the threshold circuit (3) comprises a bipolar transistor having a base connected to a tap of a second voltage divider coupled to the input terminal, whose collector is connected to a control electrode of the third semiconductor switch via a second resistor, and whose emitter is connected to a common reference potential via a zener diode (Z) and to a first pole (E1−) of the supply voltage (E+) via a third resistor.

3. A power supply as claimed in claim 2, wherein the first, second and third semiconductor switches comprise n-channel MOS field effect transistors of the enhancement type, whose source electrodes are connected to a potential node which is connected in turn to the first pole of the supply voltage via a diode, and means for coupling said potential node via the shunt resistor to a first pole of an operating voltage which is applied to the storage capacitor.

4. A power supply as claimed in claim 2, wherein the first capacitor is charged by a constant-current source connected to the common reference potential.

5. A power supply as claimed in claim 4, wherein the constant-current source comprises a field effect transistor having a drain electrode connected to the common reference potential and a gate electrode connected to the first capacitor and, via a fourth resistor, to its source electrode.

6. A power supply as claimed in claim 4, wherein the second capacitor is charged via a fifth resistor (R5) which is connected to the common reference potential.

7. A power supply as claimed in claim 1, wherein at least one further semiconductor switch is connected in parallel to the first semiconductor switch.

8. A power supply as claimed in claim 1, wherein the first, second and third semiconductor switches comprise n-channel MOS field effect transistors of the enhancement type, whose source electrodes are connected to a potential node which is connected in turn to the first pole of the supply voltage via a diode, and means for coupling said potential node via the shunt resistor to a first pole of an operating voltage which is applied to the storage capacitor.

9. A power supply as claimed in claim 1, wherein the first capacitor is charged by a constant-current source connected to a common reference potential.

10. A power supply as claimed in claim 9, wherein the constant-current source comprises a field effect transistor having a drain electrode connected to the common reference potential and a gate electrode connected to the first capacitor and, via a further resistor, to its source electrode.

11. A power supply as claimed in claim 1, wherein the second capacitor is charged via a further resistor which is connected to a common reference potential.

12. A power supply as claimed in claim 2, wherein the second capacitor is charged via a further resistor which is connected to the common reference potential.

13. A power supply comprising:
a pair of input terminals for connection to a supply voltage,
a pair of output terminals for connection to a load,
a storage capacitor coupled to said output terminals, and
a current limit circuit which comprises;
a first controlled semiconductor switch coupled between a first of said input terminals and a first of said output terminals,
a current limit resistor connected in parallel arrangement with said first semiconductor switch,
means coupling a time delay unit to one of said input terminals and to a control electrode of the first semiconductor switch so as to delay turn-on of the first semiconductor switch when a supply voltage is initially applied to the input terminals,
means coupling a control circuit to said control electrode of the first semiconductor switch for controlling conduction thereof, and a voltage threshold circuit coupled to said input terminals and with a control output coupled to said control circuit, said voltage threshold circuit being responsive to a supply voltage at the input terminals so as to provide a control signal via said control circuit that is operative to switch off the first semiconductor switch when the supply voltage is below a given voltage threshold value.

14. A power supply as claimed in claim 13, wherein said first semiconductor switch comprises a field effect transistor and said voltage threshold circuit comprises a bipolar transistor that is switchable as a function of the voltage level of the supply voltage.

15. A power supply as claimed in claim 13, wherein said time delay unit includes a parallel resistor-capacitor (RC) circuit coupled to said one input terminal via a source of constant current.

16. A power supply as claimed in claim 15, wherein said control circuit includes a second controlled semiconductor switch coupled to said RC circuit and controlled by the voltage threshold circuit so as to discharge the capacitor of the RC circuit when the supply voltage is below said given voltage threshold value.

17. A power supply as claimed in claim 16, wherein said control circuit further comprises a voltage divider coupled to said input terminals and with a tap point connected to a control electrode of the second semiconductor switch, and a further capacitor connected in parallel with said voltage divider.

18. A power supply as claimed in claim 17, wherein said voltage threshold circuit comprises a second voltage divider coupled to said input terminals and a bipolar switching transistor having a control electrode coupled to a tap point on the second voltage divider, and means coupled to one of said input terminals for supplying a reference voltage to one main electrode of the bipolar switching transistor.

19. A power supply as claimed in claim 17, wherein said control circuit comprises a further resistor which couples said further capacitor to one of said input terminals to provide a charge path for the further capacitor.

20. A power supply as claimed in claim 13 further comprising a semiconductor diode connected in series circuit with said parallel arrangement of the first semiconductor switch and the current limit resistor.

* * * * *